(12) United States Patent
Sekiguchi et al.

(10) Patent No.: US 9,122,258 B2
(45) Date of Patent: Sep. 1, 2015

(54) MOTOR CONTROL DEVICE

(75) Inventors: Hiroyuki Sekiguchi, Tokyo (JP); Hidetoshi Ikeda, Tokyo (JP); Kiyoshi Maekawa, Tokyo (JP); Takashi Isoda, Tokyo (JP); Shuya Sano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 106 days.

(21) Appl. No.: 14/116,914

(22) PCT Filed: Apr. 2, 2012

(86) PCT No.: PCT/JP2012/058837
§ 371 (c)(1),
(2), (4) Date: Nov. 11, 2013

(87) PCT Pub. No.: WO2012/160874
PCT Pub. Date: Nov. 29, 2012

(65) Prior Publication Data
US 2014/0077746 A1    Mar. 20, 2014

(30) Foreign Application Priority Data

May 24, 2011   (JP) ................................. 2011-116197

(51) Int. Cl.
  *H02P 3/00*   (2006.01)
  *G05B 13/02*  (2006.01)
  *H02P 23/14*  (2006.01)

(52) U.S. Cl.
  CPC .............. *G05B 13/02* (2013.01); *H02P 23/14* (2013.01)

(58) Field of Classification Search
  CPC ...................................................... G05B 13/02
  USPC ......... 318/114, 115, 119, 120, 127, 128, 135,
        318/686, 689, 560, 561, 62, 66, 101, 721,
        318/779, 799, 400.14, 400.15, 430, 432,
        318/434, 437; 388/800, 904, 928;
        74/473.29
  See application file for complete search history.

(56) References Cited

U.S. PATENT DOCUMENTS 8,775,019 B2 *   7/2014   Okamoto et al. ................ 701/36
2009/0009128 A1 *  1/2009  Okita et al. .................... 318/619
(Continued)

FOREIGN PATENT DOCUMENTS

JP    09 093998    4/1997
JP    2001 178188  6/2001
(Continued)

OTHER PUBLICATIONS

International Search Report Issued Jul. 3, 2012 in PCT/JP12/058837 Filed Apr. 2, 2012.
(Continued)

*Primary Examiner* — Antony M Paul
(74) *Attorney, Agent, or Firm* — Oblon, McClelland, Maier & Neustadt, L.L.P.

(57) ABSTRACT

A motor control device includes an operation determination unit that determines whether a motor is in an operating state or in a stopped state based on an operation command signal or an operation signal and an amplitude estimation unit that, based on a determination result of the operation determination unit, sequentially estimates a vibration amplitude value from a control state quantity of a feedback control unit or a current control unit separately for a case where the motor is operated and a case where the motor is stopped and outputs the vibration amplitude value. A function of outputting an amplitude of a high-frequency vibration that occurs in a mechanical device including a control system as information useful for estimating an occurrence factor of the vibration is provided.

6 Claims, 5 Drawing Sheets

(56) References Cited

U.S. PATENT DOCUMENTS

2009/0102409 A1    4/2009   Okita et al.
2012/0007540 A1    1/2012   Tanabe et al.

FOREIGN PATENT DOCUMENTS

| | | |
|---|---|---|
| JP | 2004 318492 | 11/2004 |
| JP | 2005 92297 | 4/2005 |
| JP | 2005 266902 | 9/2005 |
| JP | 2008 79477 | 4/2008 |
| JP | 2008 118750 | 5/2008 |
| JP | 2009 106034 | 5/2009 |
| JP | 2009 118684 | 5/2009 |
| JP | 2010 166686 | 7/2010 |
| TW | 201041293 A1 | 11/2010 |
| WO | 2004 008624 | 1/2004 |
| WO | 2010 119605 | 10/2010 |

OTHER PUBLICATIONS

Combined Taiwanese Office Action and Search Report issued Jan. 14, 2014 in Patent Application No. 101118115 (with partial English language translation and English translation of categories of cited documents).

Korean Office Action issued Aug. 27, 2014, in Korea Patent Application No. 10-2013-7030586 (with English translation).

* cited by examiner

MOTOR CONTROL DEVICE

FIELD

The present invention relates to a motor control device that drives a controlled object that includes a motor and a mechanical system having the motor connected thereto.

BACKGROUND

According to a mechanical device driven by a motor connected thereto, there are some cases where characteristics of the mechanical device including a motor control system appear in operation signals such as the rotation position, the speed, the torque of the motor, and the like. A motor control device having a function of extracting such characteristics from the operation signals and outputting the characteristics has been also proposed.

For example, when a motor that drives a mechanical device is feedback-controlled, in order to increase the responsiveness of the mechanical device, it is necessary to set a feedback gain to be large. However, when the feedback gain is too large at the time of a start-up adjustment of the mechanical device, signal components corresponding to high-frequency mechanical-resonance characteristics are excited. Consequently, a drive command (a torque command, for example) to the motor becomes vibrational and thus an operation of the mechanical device becomes vibrational.

Such a vibration is caused by a degradation in stability of a feedback control system. That is, as an index of the stability of a control system, a high-frequency vibration that appears in a drive command can be used. Here, a method has been proposed. That is, while a vibration state of a drive command to a motor is monitored, the responsiveness of a mechanical device is increased and a feedback gain is adjusted so as not to degrade the stability of the control system (see, for example, Patent Literature 1).

Patent Literature 1 discloses the invention that includes a unit of detecting a vibration when a motor is stopped at a position where an adjustment is performed to adjust a feedback gain at a plurality of positions in a movable range of a machine.

As another example of using a high-frequency vibration, a technique of detecting a high-frequency oscillation to safely stop a motor has been proposed (see, for example, Patent Literature 2). Patent Literature 2 discloses the invention that includes a unit of blocking control of a motor and a current command signal when an oscillation state of the motor is detected.

CITATION LIST

Patent Literatures

Patent Literature 1: WO2004/008624
Patent Literature 2: Japanese Patent Application Laid-open No. 2001-178188

SUMMARY

Technical Problem

In addition to a case where a feedback gain is too increased at the time of the adjustment of a mechanical device, an operation of the mechanical device sometimes becomes vibrational. When the mechanical characteristics of the mechanical device are changed such as when a mechanical-resonance frequency is reduced due to a change over time and the like or when a mechanical resonance attenuation is reduced, even though setting of a feedback gain is not changed, there are some cases where the setting is such that the feedback gain is too increased for the mechanical characteristics after the change over time. Therefore, the stability of a control system is degraded and a high-frequency vibration may occur.

In addition to a vibration due to the degradation in the stability of the control system, a high-frequency vibration phenomenon sometimes appears in the operation of the mechanical device when an abnormality, such as a damage or wear of a movable mechanism or intrusion of foreign matters, occurs in a movable part of the mechanical device, such as a ball screw or a ball bearing, due to a change over time and the like.

In a mechanical device having, in addition to a positioning motor, a machining motor for rotating a mechanical machining tool or a workpiece connected thereto like a machine tool, a vibration occurs when the machining motor is operated to perform mechanical machining and the influence of the vibration sometimes appears also in the positioning motor as a vibration phenomenon.

The vibration phenomenon that occurs in the mechanical device not only influences the operation precision of the mechanical device but also may severely damage the mechanical device when a vibration amplitude is increased.

If a change over time in the vibration phenomenon that appears in the mechanical device can be detected, it is conceivable that maintenance of the mechanical device is performed before the vibration amplitude is increased, thereby being capable of minimizing a damage to the mechanical device. If the occurrence factor of the vibration has been found, the time required for the maintenance can be reduced.

However, a conventional vibration detection function is provided for using a vibration as an index at the time of the adjustment of a control system. Accordingly, this function can check whether an abnormality occurs, but it is difficult to acquire information useful for distinguishing whether a detected vibration is due to a degradation in the stability of the control system or due to an abnormality of a movable part of a machine.

The present invention has been achieved in view of the above, and an object of the present invention is to provide a motor control device that has a function of outputting an amplitude of a high-frequency vibration that occurs in a mechanical device including a control system as information useful for estimating an occurrence factor of the vibration.

Solution to Problem

In order to achieve the object, in the present invention, a motor control device, which includes a feedback control unit that calculates a torque command based on an operation command signal that commands an operation of a motor connected to a mechanical device and an operation detection signal that detects an operation of the motor, and a current control unit that outputs a drive current for driving the motor based on the torque command, includes an operation determination unit that determines that the motor is in an operating state when an absolute value of a speed signal of the motor acquired directly or by a calculation based on the operation command signal or the operation detection signal is equal to or larger than a threshold, and that determines that the motor is in a stopped state when the absolute value is smaller than the threshold; an operated-time amplitude estimation unit that, when it is determined by the operation determination unit that the motor is in an operating state, sequentially calculates a vibration amplitude value included in a control state quantity of the feedback control unit or the current control unit and outputs the vibration amplitude value as an operated-time amplitude value; and a stopped-time amplitude-estimation unit that, when it is determined by the operation determination unit that the motor is in a stopped state, sequentially calculates a vibration amplitude value included in a control state quantity of the feedback control unit or the current control unit and outputs the vibration amplitude value as a stopped-time amplitude value.

Advantageous Effects of Invention

According to the present invention, an amplitude value of a high-frequency vibration included in the control state quantity of a control system is separately output by sequential averaging it depending on a running state whether a motor is in an operating state or a stopped state. Accordingly, it is possible to provide a user with information useful for assuming whether the vibration occurrence factor is a degradation in stability of a feedback control system or an abnormality such as a damage to a movable part of a mechanical device having the motor connected thereto due to a change over time. Therefore, the user can recognize whether an abnormality has occurred in the control system or in the mechanical device by a change in the vibration amplitude value.

DESCRIPTION OF EMBODIMENTS

Exemplary embodiments of a motor control device according to the present invention will be explained below in detail with reference to the drawings. The present invention is not limited to the embodiments.

First Embodiment

Figure 1:
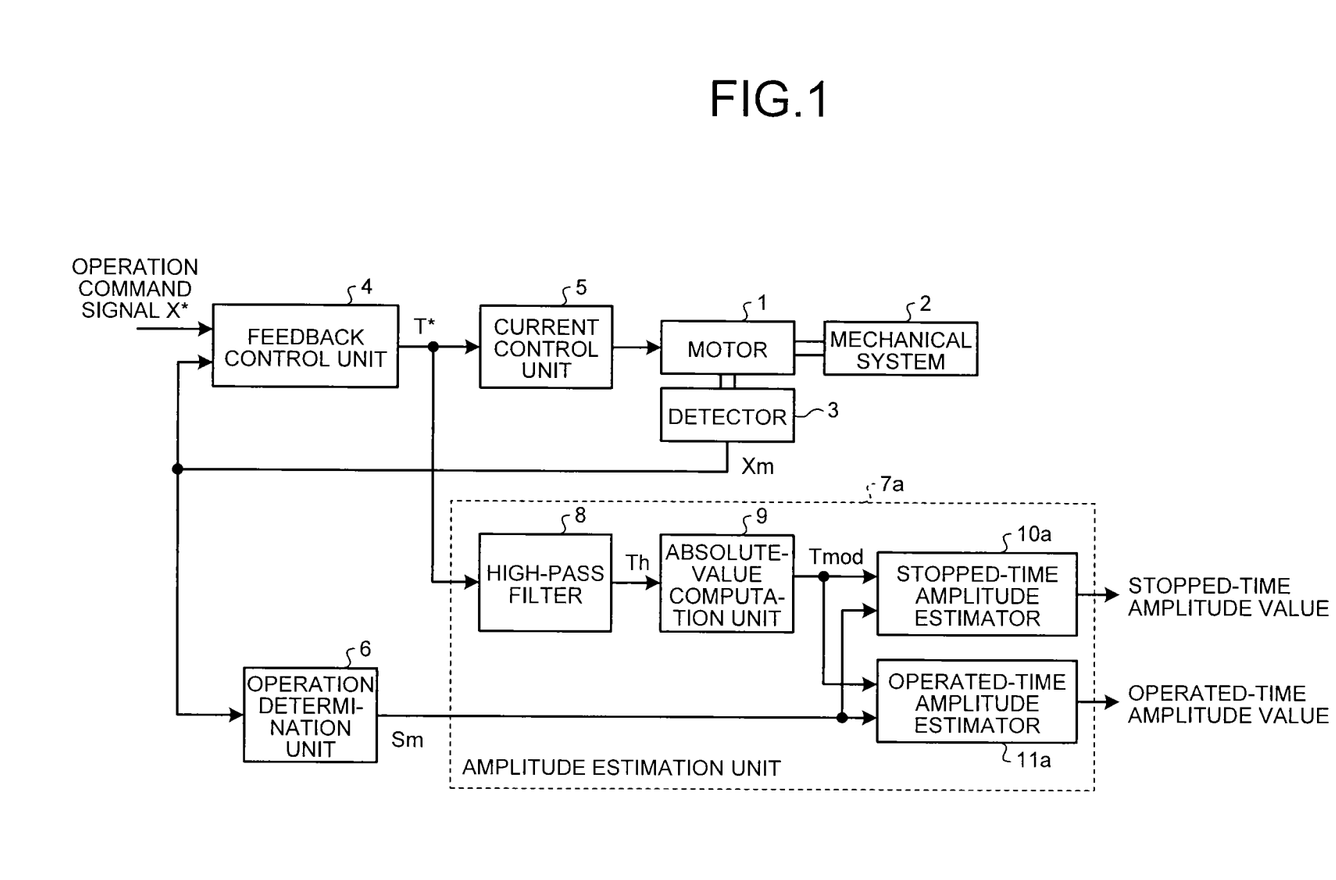
FIG. 1 is a block diagram illustrating a configuration of a motor control device according to a first embodiment of the present invention.

FIG. 1 is a block diagram illustrating a configuration of a motor control device according to the first embodiment of the present invention. In FIG. 1, the motor control device according to the first embodiment drives a controlled object that includes a motor 1 and a mechanical system 2 having the motor 1 connected thereto. The motor control device includes, as a basic configuration, a feedback control unit 4 having an operation command signal X* from a higher-level device and an operation signal Xm output by a detector 3 mounted on the motor 1 input thereto and a current control unit 5 that receives an output (a torque command) T* of the feedback control unit 4.

According to the motor control device of the first embodiment, in addition to the basic configuration, an operation determination unit 6 and an amplitude estimation unit 7a are added thereto. The amplitude estimation unit 7a includes a high-pass filter 8, an absolute-value computation unit 9, a stopped-time amplitude estimator 10a, and an operated-time amplitude estimator 11a.

The basic configuration is briefly explained first. The operation command signal X* from a higher-level device is a position command signal or a speed command signal to the motor 1 or the mechanical system 2 having the motor 1 connected thereto. The operation signal Xm output by the detector 3 is a detection signal that indicates an operating position or an operating speed of the motor 1.

The feedback control unit 4 performs processing including a proportional computation, an integral computation, and the like based on the operation command signal X* and the operation signal Xm to generate and output the torque command T*. The current control unit 5 outputs a drive current for driving the motor 1 based on the torque command T*.

The operation determination unit 6 has the operation signal Xm input thereto and outputs an operation determination signal Sm to the amplitude estimation unit 7a. When the input operation signal Xm indicates a motor speed, the operation determination unit 6 compares an absolute value of the input motor-speed value with a threshold. When the input operation signal Xm indicates a motor position, the operation determination unit 6 converts the input motor position into a motor speed and compares an absolute value of the converted motor-speed value with the threshold. As a result of the comparison, when the absolute value of the motor speed is equal to or larger than the threshold, the operation determination unit 6 determines that the motor 1 is in an operating state. When the absolute value of the motor speed is smaller than the threshold, the operation determination unit 6 determines that the motor 1 is in a stopped state. The operation determination unit 6 outputs the respective determination results as the operation determination signal Sm.

Next, the amplitude estimation unit 7a has the operation determination signal Sm output by the operation determination unit 6 and the torque command T* output by the feedback control unit 4 input thereto, and separately outputs an estimated stopped-time amplitude value and an estimated operated-time amplitude value. The operation determination signal Sm is one input of each of the stopped-time amplitude estimator 10a and the operated-time amplitude estimator 11a. The torque command T* is the other input of each of the stopped-time amplitude estimator 10a and the operated-time amplitude estimator 11a via the high-pass filter 8 and the absolute-value computation unit 9.

The signal component of the torque command T* is mainly a low-frequency signal component such as an acceleration/deceleration torque for the motor 1 operating based on the operation command signal X*, a friction-corresponding torque for friction, a steady torque for gravity and the like. In most cases, the amplitude of a high-frequency vibration serving as an index of an abnormality is smaller than those of these signal components.

In order to estimate and output the amplitude of a high-frequency vibration serving as a component having a smaller amplitude than that of the low-frequency signal component, the amplitude estimation unit 7a extracts only a high-frequency vibration included in the torque command T* and estimates the amplitude from the extracted signal.

The low-frequency signal component, such as the acceleration/deceleration torque, hardly includes a frequency higher than a control band of a feedback control system. Accordingly, first, by the high-pass filter 8 that has the characteristic of passing only a signal component of a frequency higher than a set frequency, only a high-frequency vibration included in the torque command T* is extracted. The high-pass filter 8 outputs a high-pass torque signal Th obtained by extracting the high-frequency vibration.

Next, the absolute-value computation unit 9 outputs a torque absolute-value signal Tmod serving as an absolute value of the high-pass torque signal Th. The stopped-time amplitude estimator 10a and the operated-time amplitude estimator 11a then sequentially calculate and output an average value of the torque absolute-value signal Tmod, thereby outputting an estimated value of a vibration amplitude.

When the input operation-determination signal Sm indicates a stopped state, the stopped-time amplitude estimator 10a calculates a stopped-time amplitude value by sequential averaging thereof and outputs the stopped-time amplitude value. On the other hand, when the input operation-determination signal Sm indicates an operating state, the stopped-time amplitude estimator 10a stops the calculation and maintains the internal state.

When the input operation-determination signal Sm indicates the operating state, the operated-time amplitude estimator 11a calculates an operated-time amplitude value by sequential averaging thereof and outputs the operated-time amplitude value. On the other hand, when the input operation-determination signal Sm indicates the stopped state, the operated-time amplitude estimator 11a stops the calculation and maintains the internal state.

In this way, the amplitude estimation unit 7a can have the operation determination signal Sm and the torque command T* input thereto, estimate the amplitude value of a high-frequency vibration included in the torque command T* by sequential averaging thereof, and output the operated-time amplitude value and the stopped-time amplitude value separately in a case where the motor 1 is in an operating state and in a case where the motor 1 is in a stopped state.

Among high-frequency vibrations that occur in a mechanical device including a control system, a vibration phenomenon caused by a damage to a movable mechanism of a movable part of the mechanical device, such as a ball screw, a linear guide, or a ball bearing, occurs according to the number of rotations of a motor at the time of the rotation of the motor. On the other hand, when the motor is stopped, this vibration phenomenon does not occur. Meanwhile, a vibration due to a degradation in stability of a feedback control system occurs regardless of the motor being operated or stopped unless a feedback gain is changed.

Accordingly, by monitoring the operated-time amplitude value and the stopped-time amplitude value separately output by the amplitude estimation unit 7a, an occurrence factor of a vibration can be specifically assumed. That is, when the stopped-time amplitude value is not changed and only the operated-time amplitude value is increased, it is possible to assume that a vibration amplitude is increased due to an abnormality of the movable part of the mechanical device caused by a change over time. When the stopped-time amplitude value and the operated-time amplitude value are both increased, it is possible to assume that the vibration amplitude is increased due to the degradation in the stability of the feedback control system.

While the amplitude estimation unit 7a estimates the vibration amplitude based on the torque command T*, the amplitude estimation unit 7a may estimate the vibration amplitude based on, for example, the control state quantity of the feedback control unit 4 or the current control unit 5.

While the operation determination unit 6 determines the operating state and the stopped state of the motor 1 based on the operation signal Xm detected by the detector 3, for example, because the operation command signal X* from a higher-level device can also estimate a running state whether the motor 1 is in the operating state or the stopped state, the operation command signal X* may be used.

Alternatively, it is possible to use the acceleration/deceleration torque and the friction torque that are estimated based on the operation signal Xm, and the steady torque measured in advance to generate a signal having the acceleration/deceleration torque, the friction torque, and the steady torque removed from the torque command T*, thereby calculating a high-frequency vibration amplitude based on the generated signal. In this case, the high-pass filter 8 can be omitted.

As explained above, the motor control device according to the first embodiment can separately output the amplitude value of a high-frequency vibration that occurs in a mechanical device including a control system depending on a running state whether a motor is in an operating state or a stopped state. Accordingly, it is possible to provide a user with information useful for assuming whether the vibration occurrence factor is a degradation in stability of a feedback control system or an abnormality such as a damage to a movable part of a mechanical device having the motor connected thereto due to a change over time.

Accordingly, the user can recognize whether an abnormality has occurred in the control system or in the mechanical device by a change in the vibration amplitude value.

Second Embodiment

Figure 2:
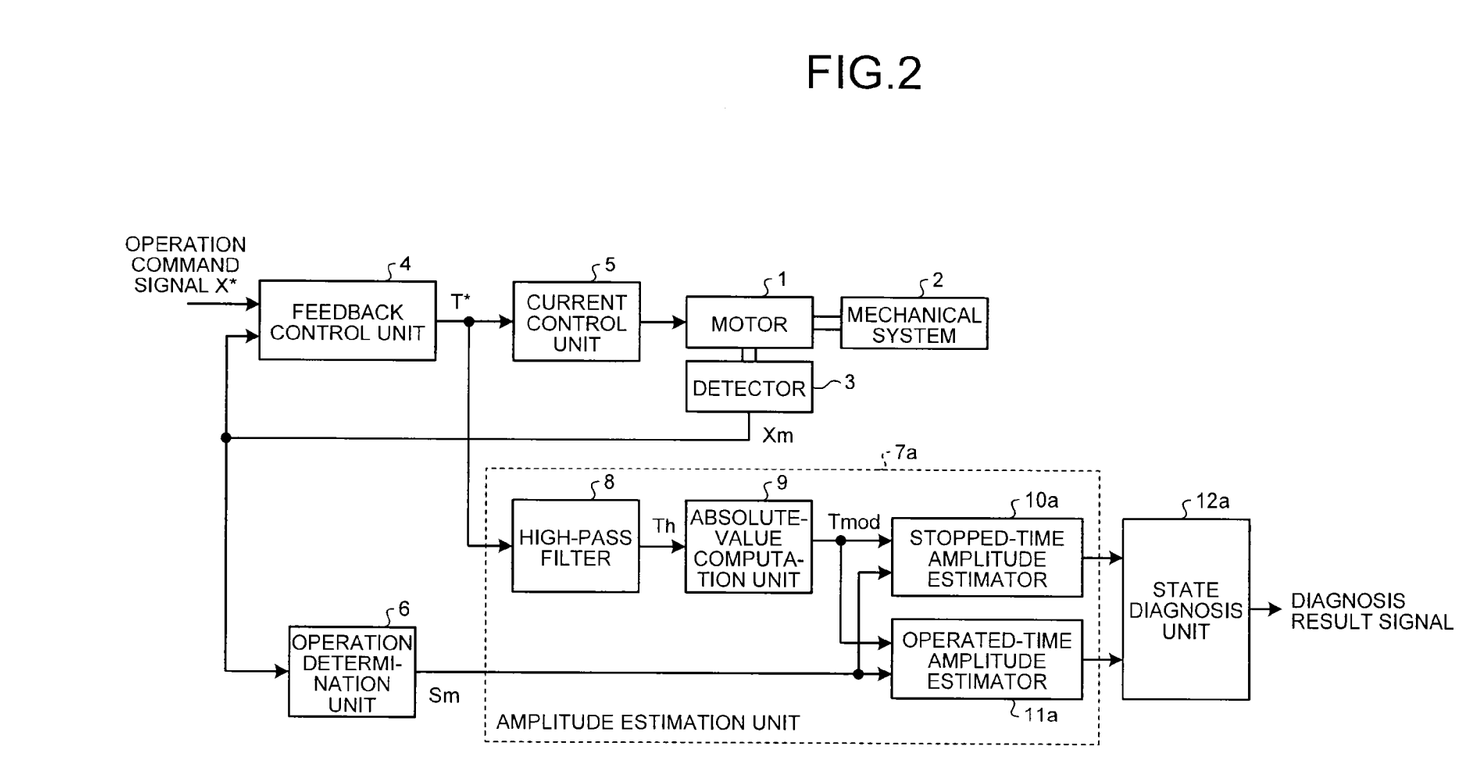
FIG. 2 is a block diagram illustrating a configuration of a motor control device according to a second embodiment of the present invention.

FIG. 2 is a block diagram illustrating a configuration of a motor control device according to the second embodiment of the present invention. In FIG. 2, constituent elements identical or equivalent to those shown in FIG. 1 (the first embodiment) are denoted by like reference signs. Features according to the second embodiment are mainly explained.

As shown in FIG. 2, according to the motor control device of the second embodiment, a state diagnosis unit 12a is added to the configuration shown in FIG. 1 (the first embodiment).

The state diagnosis unit 12a has a stopped-time amplitude value estimated by the stopped-time amplitude estimator 10a and an operated-time amplitude value estimated by the operated-time amplitude estimator 11a input thereto, sets a first threshold for the stopped-time amplitude value and a second threshold for the operated-time amplitude value, and outputs comparison results of magnitude relationships with respect to the respective thresholds as a diagnosis result signal.

That is, when the stopped-time amplitude value estimated by the stopped-time amplitude estimator 10a is equal to or smaller than the first threshold and the operated-time amplitude value estimated by the operated-time amplitude estimator 11a exceeds the second threshold, the state diagnosis unit 12a outputs a diagnosis result signal that indicates a damage abnormality of a movable part (a ball screw, a ball bearing, and the like) of a machine as the diagnosis result. When the stopped-time amplitude value exceeds the first threshold, the state diagnosis unit 12a outputs a diagnosis result signal that indicates an abnormality (a degradation in stability) of gain setting of a feedback control system as the diagnosis result.

As explained above, the motor control device according to the second embodiment of the present invention can identifiably output a diagnosis result signal determining that the vibration occurrence factor is a degradation in stability of a feedback control system and a diagnosis result signal determining that the vibration occurrence factor is an abnormality, such as a damage to a movable part of a mechanical device having a motor connected thereto caused by a change over time. Accordingly, a user can perform appropriate maintenance more promptly than the first embodiment.

A motor control device in which a mechanical device having one motor connected thereto is a controlled object has been described in the first and second embodiments. However, according to a mechanical device having, in addition to a positioning motor, a machining motor for rotating a mechanical machining tool or a workpiece mounted thereon like a machine tool, a vibration occurs when the machining motor is operated to perform mechanical machining, and the influence of the vibration sometimes appears also in the positioning motor as a vibration phenomenon. Therefore, a motor control device in which a mechanical device having a plurality of motors connected thereto is a controlled object is explained below as third to fifth embodiments.

Third Embodiment

Figure 3:
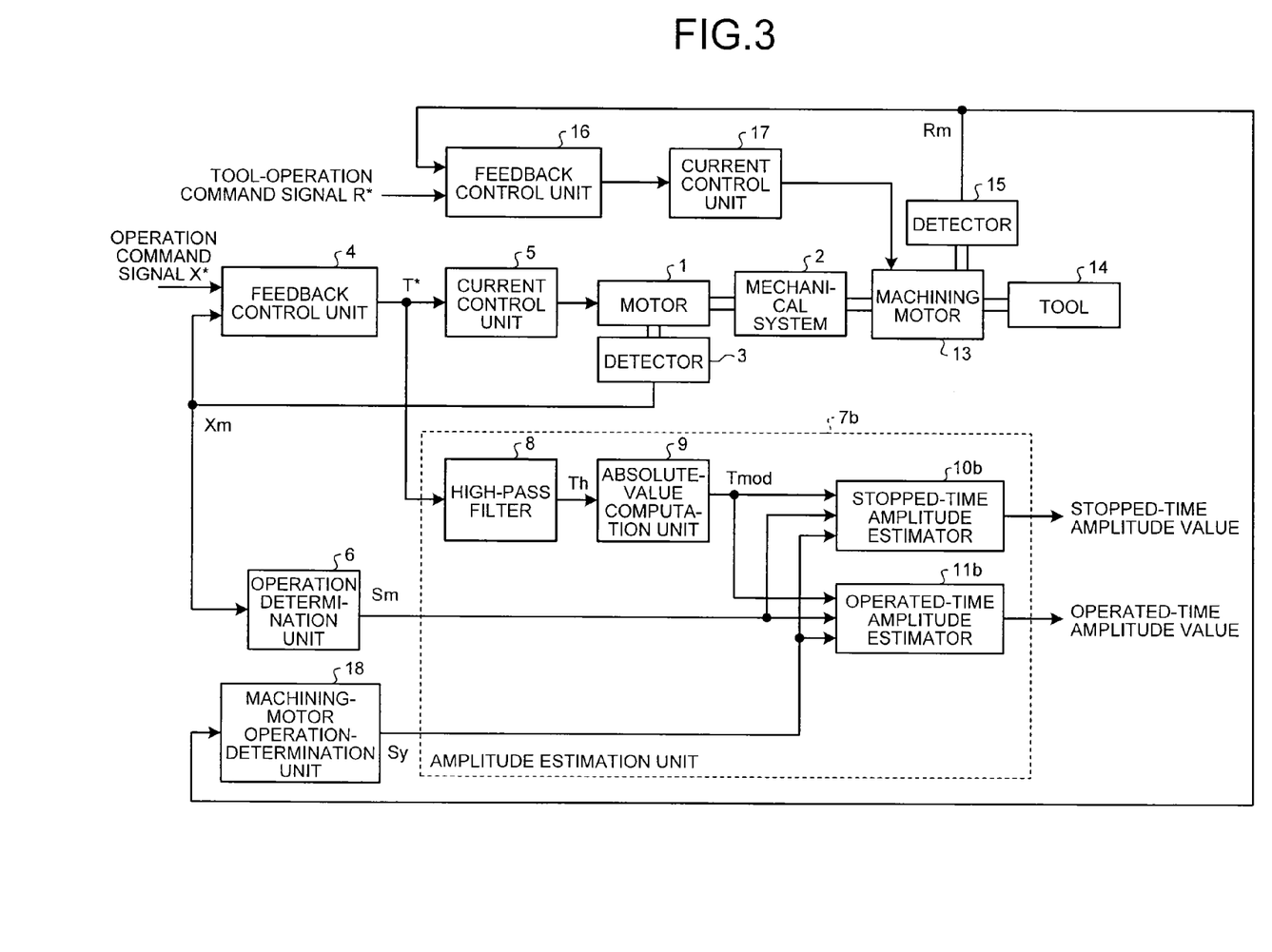
FIG. 3 is a block diagram illustrating a configuration of a motor control device according to a third embodiment of the present invention.

FIG. 3 is a block diagram illustrating a configuration of a motor control device according to the third embodiment of the present invention. In FIG. 3, constituent elements identical or equivalent to those shown in FIG. 1 (the first embodiment) are denoted by like reference signs. Features according to the third embodiment are mainly explained.

As shown in FIG. 3, according to the motor control device of the third embodiment, a machining motor 13, a tool 14, a detector 15, a feedback control unit 16, a current control unit 17, and a machining-motor operation-determination unit 18 are added to the configuration shown in FIG. 1 (the first embodiment). A stopped-time amplitude estimator 10b and an operated-time amplitude estimator 11b having the respective reference numerals changed are provided in an amplitude estimation unit 7b having a reference numeral changed.

The machining motor 13 is connected to the mechanical system 2 having the motor 1 connected thereto, and the tool 14 is mounted on a rotating shaft of the machining motor 13. The detector 15 is incorporated in the machining motor 13 and outputs a detected operating position and a detected operating speed to the feedback control unit 16 and the machining-motor operation-determination unit 18 as a machining-motor operation signal Rm.

The feedback control unit 16 performs processing including a proportional computation, an integral computation, and the like based on a tool-operation command signal R* from a higher-level device and the machining-motor operation signal Rm to generate and output a torque command to the machining motor 13. The current control unit 17 outputs a drive current for driving the machining motor 13 based on the torque command output by the feedback control unit 16.

The machining-motor operation-determination unit 18 generates a machining-motor operation-determination signal Sy by the machining-motor operation signal Rm input from the detector 15. Specifically, when the input machining-motor operation signal Rm indicates a motor speed, the machining-motor operation-determination unit 18 compares an absolute value of the input motor-speed value with a threshold. When the input machining-motor operation signal Rm indicates a motor position, the machining-motor operation-determination unit 18 converts the input motor position into a motor speed and compares an absolute value of the converted motor-speed value with the threshold. As a result, when the absolute value is equal to or larger than the threshold, the machining-motor operation-determination unit 18 determines that the machining motor 13 is in an operating state. When the absolute value is smaller than the threshold, the machining-motor operation-determination unit 18 determines that the machining motor 13 is in a stopped state. The machining-motor operation-determination unit 18 outputs the respective determination results as the machining-motor operation-determination signal Sy.

The machining-motor operation-determination signal Sy output by the machining-motor operation-determination unit 18 is input to the stopped-time amplitude estimator 10b and the operated-time amplitude estimator 11b as a third signal.

When the machining motor 13 is rotated to perform mechanical machining, the influence of a vibration that occurs at the time of mechanical machining sometimes appears as a vibration phenomenon in the torque command T* to the motor 1. This vibration phenomenon does not have any relationship with a change over time in a mechanical system including a control system for the motor 1. Accordingly, a stopped-time amplitude value and an operated-time amplitude value need to be estimated and output so as not to be influenced by this vibration phenomenon.

Therefore, when the machining-motor operation-determination signal Sy that indicates a determination result that the machining motor 13 is in a stopped state and the operation determination signal Sm that indicates a determination result that the motor 1 is in a stopped state are input to the stopped-time amplitude estimator 10b, the stopped-time amplitude estimator 10b sequentially calculates and outputs the stopped-time amplitude value. In other cases, the stopped-time amplitude estimator 10b stops the calculation and maintains the internal state.

When the machining-motor operation-determination signal Sy that indicates the determination result that the machining motor 13 is in the stopped state and the operation determination signal Sm that indicates the determination result that the motor 1 is in an operating state are input to the operated-time amplitude estimator 11b, the operated-time amplitude estimator 11b sequentially calculates and outputs the operated-time amplitude value. On the other hand, in other cases, the operated-time amplitude estimator 11a stops the calculation and maintains the internal state.

In this way, the amplitude estimation unit 7b has the operation determination signal Sm, the machining-motor operation-determination signal Sy, and the torque command T* input thereto, sequentially estimates the amplitude value of a high-frequency vibration included in the torque command T* according to the running state of the motor 1 and the machining motor 13, and outputs the amplitude value separately as the stopped-time amplitude value and the operated-time amplitude value.

While the machining-motor operation-determination unit 18 determines the operating state and the stopped state of the machining motor 13 based on the machining-motor operation signal Rm, because a running state whether the machining motor 13 is in the operating state or in the stopped state can be estimated based on the tool-operation command signal R*, the tool-operation command signal R* may be used.

As explained above, in a mechanical device having the machining motor 13 that causes a vibration that influences the motor 1 to occur therein connected thereto, the motor control device according to the third embodiment can eliminate the influence of a vibration occurring at the time of an operation of the machining motor 13 and output an operated-time amplitude value and a stopped-time amplitude value for the motor 1. Accordingly, similarly to the first embodiment, it is possible to easily understand a factor that the vibration amplitude of the motor 1 becomes large.

Similarly to the second embodiment, it is also possible to provide a state diagnosis unit that has a stopped-time amplitude value and an operated-time amplitude value input thereto and outputs a diagnosis result signal that notifies a user of an abnormality such as a damage to a movable part of a machine and a diagnosis result signal that notifies a user of an abnormality of gain setting of a feedback control system. In this case, the state diagnosis unit can have the same configuration as that of the state diagnosis unit 12a according to the second embodiment.

Fourth Embodiment

Figure 4:
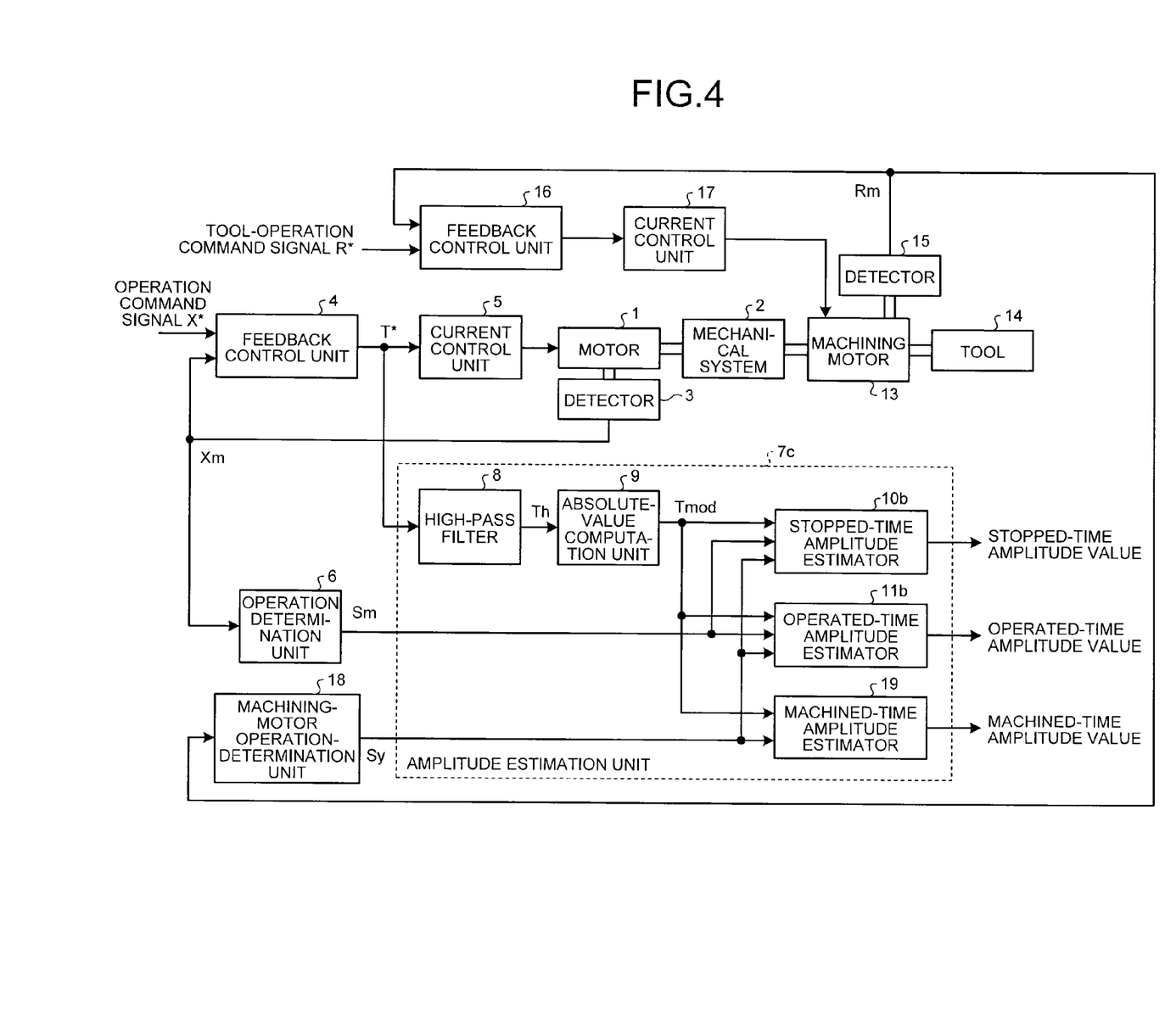
FIG. 4 is a block diagram illustrating a configuration of a motor control device according to a fourth embodiment of the present invention.

FIG. 4 is a block diagram illustrating a configuration of a motor control device according to the fourth embodiment of the present invention. In FIG. 4, constituent elements identical or equivalent to those shown in FIG. 3 (the third embodiment) are denoted by like reference signs. Features according to the fourth embodiment are mainly explained.

As shown in FIG. 4, according to the motor control device of the fourth embodiment, an amplitude estimation unit 7c instead of the amplitude estimation unit 7b is included in the configuration shown in FIG. 3 (the third embodiment). In the amplitude estimation unit 7c, a machined-time amplitude estimator 19 is added to the amplitude estimation unit 7b.

The machined-time amplitude estimator 19 has the torque absolute-value signal Tmod output by the absolute-value computation unit 9 and the machining-motor operation-determination signal Sy output by the machining-motor operation-determination unit 18 input thereto. Further, when the machining-motor operation-determination signal Sy indicates an operating state, the machined-time amplitude estimator 19 sequentially calculates an average value of the torque absolute-value signal Tmod and outputs an estimated value of the amplitude at the time of machining. In other cases, the machined-time amplitude estimator 19 stops the calculation and maintains the internal state.

According to the third embodiment, when an abnormality occurs in the tool 14 connected to the machining motor 13 and the like, it is conceivable that a vibration occurring in the machining motor 13 becomes large and thus a vibration phenomenon appearing in the torque command T* also becomes large.

In order to handle such a problem, according to the motor control device of the fourth embodiment, the machined-time amplitude estimator 19 is added to the configuration of the third embodiment. The machined-time amplitude estimator 19 can sequentially average and estimate the amplitude value of a high-frequency vibration that is included in the torque command T* and caused by an influence of an operation of the machining motor 13, and output the amplitude value as a machined-time amplitude value separately from an operated-time amplitude value and a stopped-time amplitude value for the motor 1. When the machined-time amplitude value becomes large, it can be assumed that a vibration is occurring due to an abnormality of the machining motor 13 or the tool 14 connected to the machining motor 13.

Fifth Embodiment

Figure 5:
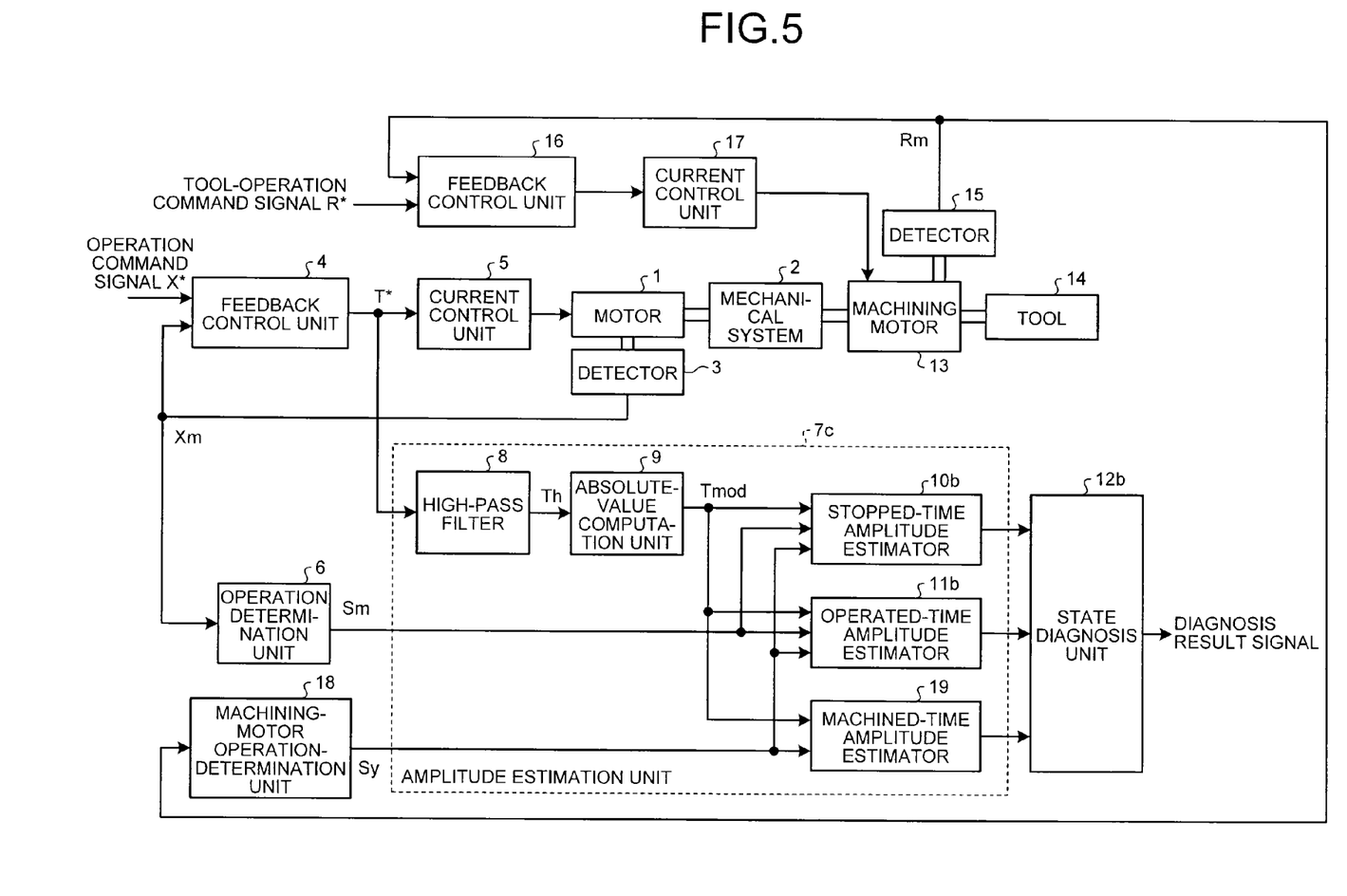
FIG. 5 is a block diagram illustrating a configuration of a motor control device according to a fifth embodiment of the present invention.

FIG. 5 is a block diagram illustrating a configuration of a motor control device according to the fifth embodiment of the present invention. In FIG. 5, constituent elements identical or equivalent to those shown in FIG. 4 (the fourth embodiment) are denoted by like reference signs. Features according to the fifth embodiment are mainly explained.

As shown in FIG. 5, according to the motor control device of the fifth embodiment, a state diagnosis unit 12b is added to the configuration shown in FIG. 4 (the fourth embodiment).

The state diagnosis unit 12b has a stopped-time amplitude value estimated by the stopped-time amplitude estimator 10b, an operated-time amplitude value estimated by the operated-time amplitude estimator 11b, and a machined-time amplitude estimated by the machined-time amplitude estimator 19 input thereto. The state diagnosis unit 12b sets a first threshold for the stopped-time amplitude value, a second threshold for the operated-time amplitude value, and a third threshold for the machined-time amplitude. Further, the state diagnosis unit 12b outputs comparison results of magnitude relationships with respect to the respective thresholds as a diagnosis result signal.

That is, when the stopped-time amplitude value is equal to or smaller than the first threshold and the operated-time amplitude value exceeds the second threshold, the state diagnosis unit 12b outputs a diagnosis result signal that indicates a damage abnormality of a movable part (a ball screw, a ball bearing, and the like) of a machine as the diagnosis result. When the stopped-time amplitude value exceeds the first threshold, the state diagnosis unit 12b outputs a diagnosis result signal that indicates an abnormality (a degradation in stability) of gain setting of a feedback control system as the diagnosis result. Further, when the machined-time amplitude value exceeds the third threshold, the state diagnosis unit 12b outputs a diagnosis result signal that indicates an abnormality of the machining motor 13 or the tool 14 connected to the machining motor 13 as the diagnosis result.

As explained above, the motor control device according to the fifth embodiment can add the state diagnosis unit 12b to the configuration of the fourth embodiment, and identifiably output a diagnosis result signal that relates to a damage to a movable part of a mechanical system and the like, a diagnosis result signal that relates to a degradation in stability of a feedback control system, and a diagnosis result signal that relates to an abnormality of the machining motor 13. Accordingly, a user can perform appropriate maintenance promptly similarly to the second embodiment.

INDUSTRIAL APPLICABILITY

As described above, the motor control device according to the present invention is useful as a motor control device having a function of outputting an amplitude of a high-frequency vibration that occurs in a mechanical device including a control system as information that is useful for estimating an occurrence factor of the vibration.

REFERENCE SIGNS LIST 1 motor
2 mechanical system
3, 15 detector
4, 16 feedback control unit
5, 17 current control unit
6 operation determination unit
7a, 7b, 7c amplitude estimation unit
8 high-pass filter
9 absolute-value computation unit
10a, 10b stopped-time amplitude estimator
11a, 11b operated-time amplitude estimator
12a, 12b state diagnosis unit
13 machining motor
14 tool
18 machining-motor operation-determination unit
19 machined-time amplitude estimator

The invention claimed is:

1. A motor control device that includes a feedback control unit that calculates a torque command based on an operation command signal that commands an operation of a motor connected to a mechanical device and an operation detection signal that detects an operation of the motor, and a current control unit that outputs a drive current for driving the motor based on the torque command, the device comprising:

an operation determination unit that determines that the motor is in an operating state when an absolute value of a speed signal of the motor acquired directly or by a calculation based on the operation command signal or the operation detection signal is equal to or larger than a threshold, and that determines that the motor is in a stopped state when the absolute value is smaller than the threshold;

an operated-time amplitude estimation unit that, when it is determined by the operation determination unit that the motor is in an operating state, sequentially calculates a vibration amplitude value included in a control state quantity of the feedback control unit or the current control unit, when it is determined by the operation determination unit that the motor is in a stopped state, stops a calculation of the vibration amplitude value and maintains an internal state, and outputs the vibration amplitude value as an operated-time amplitude value; and a stopped-time amplitude-estimation unit that, when it is determined by the operation determination unit that the motor is in a stopped state, sequentially calculates a vibration amplitude value included in a control state quantity of the feedback control unit or the current control unit, when it is determined by the operation determination unit that the motor is in an operating state, stops a calculation of the vibration amplitude value and maintains an internal state, and outputs the vibration amplitude value as a stopped-time amplitude value.

2. The motor control device according to claim 1, further comprising a state diagnosis unit that, when the stopped-time amplitude value is smaller than a first threshold and the operated-time amplitude value is equal to or larger than a second threshold, outputs a signal that indicates an abnormality of a movable part of the machine, and when the stopped-time amplitude value becomes equal to or larger than the first threshold, outputs a signal that indicates an abnormality of a feedback control system.

3. A motor control device that drives two motors, which are a first motor and a second motor, connected to a mechanical device and that includes a first feedback control unit that calculates a first torque command based on a first operation command signal that commands an operation of the first motor and a first operation detection signal that detects an operation of the first motor, and a first current control unit that outputs a drive current for driving the first motor based on the first torque command, the device comprising:

a first operation determination unit that determines that the first motor is in an operating state when an absolute value of a speed signal of the first motor acquired directly or by a calculation based on the first operation command signal or the first operation detection signal is equal to or larger than a threshold and that determines that the first motor is in a stopped state when the absolute value is smaller than the threshold;

a second operation determination unit that determines that the second motor is in an operating state when an absolute value of a speed signal of the second motor acquired directly or by a calculation based on a second operation command signal that commands an operation of the second motor or a second operation detection signal that detects an operation of the second motor is equal to or larger than a threshold and that determines that the second motor is in a stopped state when the absolute value is smaller than the threshold;

an operated-time amplitude estimation unit that, when it is determined by the second operation determination unit that the second motor is in a stopped state and it is determined by the first operation determination unit that the first motor is in an operating state, sequentially calculates a vibration amplitude value included in a control state quantity of the first feedback control unit or the first current control unit, when it is determined by the second operation determination unit that the second motor is in an operating state or it is determined by the first operation determination unit that the first motor is in a stopped state, stops a calculation of the vibration amplitude value and maintains an internal state, and outputs the vibration amplitude value as an operated-time amplitude value; and a stopped-time amplitude estimation unit that, when it is determined by the second operation determination unit that the second motor is in a stopped state and it is determined by the first operation determination unit that the first motor is in a stopped state, sequentially calculates a vibration amplitude value included in a control state quantity of the first feedback control unit or the first current control unit, when it is determined by the second operation determination unit that the second motor is in an operating state or it is determined by the first operation determination unit that the first motor is in an operating state, stops a calculation of the vibration amplitude value and maintains an internal state, and outputs the vibration amplitude value as a stopped-time amplitude value.

4. The motor control device according to claim 3, further comprising a second-motor-operated-time amplitude estimation unit that, when it is determined by the second operation determination unit that the second motor is in an operating state, sequentially calculates a vibration amplitude value included in a control state quantity of the first feedback control unit or the first current control unit, when it is determined by the second operation determination unit that the second motor is in a stopped state, stops a calculation of the vibration amplitude value and maintains an internal state, and outputs the vibration amplitude value as an operated-time amplitude value of the second motor.

5. The motor control device according to claim 4, further comprising a state diagnosis unit that, when the stopped-time amplitude value is smaller than a first threshold and the operated-time amplitude value is equal to or larger than a second threshold, outputs a signal that indicates an abnormality of a movable part of the machine, when the stopped-time amplitude value becomes equal to or larger than the first threshold, outputs a signal that indicates an abnormality of a feedback control system, and when the second-motor-operated-time amplitude value becomes equal to or larger than a third threshold, outputs a signal that indicates an abnormality of the second motor.

6. The motor control device according to claim 3, further comprising a state diagnosis unit that, when the stopped-time amplitude value is smaller than a first threshold and the operated-time amplitude value is equal to or larger than a second threshold, outputs a signal that indicates an abnormality of a movable part of the machine, and when the stopped-time amplitude value becomes equal to or larger than the first threshold, outputs a signal that indicates an abnormality of a feedback control system.

* * * * *